United States Patent [19]

Allan et al.

[11] Patent Number: 4,740,392

[45] Date of Patent: Apr. 26, 1988

[54] EPOXIDE COATING COMPOSITION AND METHOD OF FORMING A COATING ON A SUBSTRATE

[75] Inventors: John L. Allan; Jeffery J. Boettcher, both of Neenah, Wis.; Norman G. Gaylord, Whippany, N.J.; Leon Katz, Norwalk, Conn.

[73] Assignee: James River-Norwalk, Inc., Norwalk, Conn.

[21] Appl. No.: 841,938

[22] Filed: Mar. 20, 1986

[51] Int. Cl.$^4$ .......................... B05D 3/02; C08K 3/10
[52] U.S. Cl. ........................ 427/386; 427/391; 427/404; 427/410; 427/411; 524/409; 524/426; 524/455
[58] Field of Search .................. 524/409, 426, 455; 427/386, 391, 404, 410, 411

[56] References Cited

U.S. PATENT DOCUMENTS

| | | | |
|---|---|---|---|
| 3,839,252 | 10/1974 | Bosso | 523/426 |
| 4,426,466 | 1/1984 | Schwartz | 523/455 |
| 4,442,245 | 4/1984 | Weiss | 523/426 |
| 4,446,260 | 5/1984 | Woods | 523/409 |
| 4,461,857 | 7/1984 | Sekmakas | 523/426 |
| 4,581,395 | 4/1986 | Nakaya | 523/409 |

*Primary Examiner*—Edward J. Smith
*Assistant Examiner*—Peter D. Mulcahy
*Attorney, Agent, or Firm*—William A. Aguele; Thomas H. Whaley

[57] ABSTRACT

A thermosetting resin composition particularly suitable for surface coatings, especially paper and paperboard, and especially those subsequently converted into shaped paperboard products, e.g. paper plates and folded cartons, with a high gloss, water and oil resistant surface coating. The composition is suitable also as both an adhesive and coating in metallizing substrates by the transfer of metallic particles from a transfer agent to the substrate. When formulated without solvents or dispersants it is suitable for use as a casting composition or as an injection molding material. The composition comprises a polymer or copolymer containing carboxylic acid groups; an epoxy compound containing an average of more than one epoxide group per molecule; a quaternary ammonium base or salt thereof; and a monomeric carboxylic acid or inorganic acid which extends the useful working life of the composition and imparts a superior gloss to the surface of the finished product.

4 Claims, No Drawings

EPOXIDE COATING COMPOSITION AND METHOD OF FORMING A COATING ON A SUBSTRATE

This invention relates to a thermosetting epoxide composition. In one of its more specific aspects, this invention relates to a coating composition having an extended pot life and capable of imparting a high gloss to coated surfaces. In another of its more specific aspects, it relates to an epoxide composition useful as both a coating and an adhesive for transfer of a metal film from a transfer agent to a substrate. In still another of its specific aspects, this invention relates to a thermosetting epoxide composition having an extended shelf life which, in the absence of a solvent, is suitable for use as a casting composition or for injection molding of shaped articles. In another one of its more specific aspects, this invention relates to a method for producing water and oil resistant, high gloss surface coatings on a suitable substrate, including, without limitation, printed or unprinted paper and paperboard.

Coated paperboard is widely used in disposable food service items, e.g. paper plates, and in a variety of other consumer products where a water-resistant coating is necessary or desirable, and in numerous packaging applications where product protection and appearance are important. Coated paper is widely used also in connection with such packaging, e.g. as a covering for uncoated paperboard packages, or as a covering for books, candies, etc. where appearance of the product is enhanced by a glossy surface. The appearance of the packaged product at the retail level is a well recognized important factor in market acceptance.

As examples of some of the above uses, many consumer products, ranging from foods, e.g. bakery products, ice cream, candies, frozen foods, juices, dairy products, meat, meat products, and the like, to personal care products, e.g. toothpaste, medications, skin creams, vitamins, cleansing tissue, personal hygiene products etc., are packaged in paperboard cartons. In most consumer packaging applications, high surface gloss is generally desirable, together with pleasing colors and graphics. High surface gloss may be obtained by overwrapping with a transparent plastic wrap or by coating the paper or paperboard with a flexible coating composition, the latter being generally preferred for most consumer product applications.

Various thermosetting resin compositions, including compositions comprising polymers or copolymers containing carboxylic acid groups, a polyfunctional epoxide and a quaternary ammonium hydroxide compound are known in the art. U.S. Pat. No. 4,458,040, for example, discloses a thermosetting aqueous coating resin composition for metals comprising an acrylic resin, an epoxy resin and an amine, where the composition has an excess of carboxyl groups as compared to oxirane groups, while U.S. Pat. No. 4,423,165 discloses a waterborne thermosetting polymer composition comprising an epoxide resin, a carboxyl-functional polymer, and a tertiary amine suitable as a coating for cans. U.S. Pat. No. 4,076,675, incorporated herein by reference, discloses a water-borne thermosetting composition which may be used as a paper coating comprising an epoxy polymer containing an average of 10 to 150 oxirane groups per molecule reacted with a tertiary amine and an alkylated amine resin or an alkylated amide resin sufficient for substantially complete consumption of the epoxy groups.

Methods for metallizing a substrate by transferring a metal film from a transfer surface to a substrate are known, per se. U.S. Pat. No. 4,382,831, for example, incorporated herein by reference, discloses a process for producing a metallic coating on a substrate, e.g. on paper or paperboard by first depositing a thin film of metal on a transfer surface, coating the substrate with an aqueous dispersion of a thermosetting resin, transferring the metal film from the transfer surface to the adhesive resin coated substrate, and curing the thermosetting resin to bond the metal film to the substrate.

Such compositions generally comprise a polymer or copolymer containing carboxylic acid groupings, a polyfunctional epoxide, and a quaternary ammonium hydroxide compound. The quaternary ammonium hydroxide, which is a strong base, acts as a catalyst for the crosslinking reactions between the carboxylic acid groupings and the epoxide. However, a common problem with such compositions is that the catalyst promotes the crosslinking reactions at low or ambient temperatures so that their useful lifetime, that is, the period during which the compositions may be used prior to thermal cure, is limited.

We have now developed compositions of the general class as those described above which comprise at least one component selected from each of the following: (a) a polymer or copolymer containing carboxylic acid groupings; (b) an epoxy-compound containing on average more than one epoxide grouping; (c) a quaternary ammonium base; and (d) a monomeric organic carboxylic acid, an inorganic acid, or both.

We have discovered that both the gloss of the finished coating and the useful working life of the compositions can be increased, unexpectedly, without significantly inhibiting the subsequent thermal cure by the additional of a monomeric acid to the formulation. These results were unexpected because, according to the literature, increasing the amounts of acidic components should reduce the effectiveness of the base catalyst and retard cross-linking during cure by heat.

The compositions disclosed are especially useful for coating paper and paperboard which may be subsequently converted into shaped articles, e.g. paper plates and cartons, by various pressing and folding operations. The compositions may be formulated without solvents for use in injection molding and casting processes and may be formulated with solvents or dispersants as coating compositions, or as adhesives.

Carboxyl-containing copolymers useful in the compositions include polymers or copolymers of acrylic, methacrylic, fumaric, maleic, itaconic, mesaconic acid, and the like and esters thereof, optionally copolymerized or terpolymerized with one or more of the monomers selected from acrylamide, methacrylamide, allyl acetate, allyl alcohol, allyl phenyl ether, acrolein, methacrolein, acrylonitrile, methacrylonitrile, methoxystyrene, ethylene, propylene, butadiene, isoprene, styrene, vinyl acetate, vinyl methyl ether, vinyl isobutyl ether, vinyl chloride, vinylidene chloride, vinyl ethyl ketone, vinyl ethyl sulfide, vinyl propionate, 1-vinyl-2-pyrrolidone, and the like.

The epoxy compound forming a component of the composition may comprise one or more of the following: bisphenol-A diglycidyl ether and polymers thereof; halogenated bisphenol-A diglycidyl ether and polymers thereof; ethylene, propylene, and butylene glycol diglycidyl ethers and polymers thereof; glycidyl ethers of glycerol, trimethylol propane, pentaerythritol, and the like; diglycidyl ether; butadiene dioxide; dihydroxydiphenyl sulfone diglycidyl ether; epoxidized novolacs derived from phenol, cresols, resorcinol, phloroglucinol, cashew nut phenol, and the like; triglycidyl isocyanurate; and epoxidized cyclohexenyl cyclohexenylacetate.

The quaternary ammonium base component of the composition may be selected from the following quaternary ammonium compounds.

(i) Compounds of the structure $$R_4N^{\oplus}Y^{\ominus}$$

wherein R may be the same or different, and is selected from the groups comprising alkyl, cycloalkyl, aryl, aralkyl, hydroxyethyl, hydroxypropyl, hydroxypoly(oxyethylene), hydroxypoly(oxypropylene), the radical —CH=CH—CH=CH—CH= (from pyridine), and the like.

The quaternary ammonium base may comprise, at least in part, the salt derived from the neutralization of the base with acid. Hence, $Y^{\ominus}$ in the above structure may be hydroxyl, or it may be an anion derived from an organic carboxylic acid, or from an inorganic acid, or a mixture of both. Examples of suitable acids include formic, acetic, octanoic, stearic, oxalic, malonic, succinic, adipic, maleic, benzoic, p-nitrobenzoic, o-phthalic, terephthalic, glycolic, lactic, aminoacetic, chloroacetic, dichloroacetic, trichloroacetic, tartaric, citric, isocitric, malic, tartronic, methyl tartronic, p-toluenesulfonic, trifluoromethane sulfonic, carbonic, hydrochloric, sulfuric, phosphoric, methyl sulfuric, boric, and the like.

(ii) Compounds containing the moieties $$R_3N^{\oplus}-CH_2CH(OH)CH_2-^{\oplus}NR_3 \ 2Y^{\ominus},$$

$$R_3N^{\oplus}-(CH_2)_n-N^{\oplus}R_3 \ 2Y^{\ominus}, \text{ and}$$

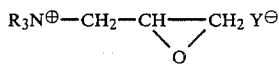

wherein R and $Y^{\ominus}$ are as defined in (i) above, and n is an integer.

(iii) Compounds containing the moieties $$R^3N^{\oplus}-CH_2CH_2CO_2^{\ominus} \text{ and}$$

$$R_3N^{\oplus}-CH_2CH_2CO_2H \ Y^{\ominus}$$

wherein R and $Y^{\ominus}$ are as defined in (i) above.

The monomeric acids contain the structure $H^{\oplus}Y^{\ominus}$ wherein $Y^{\ominus}$ is as defined in (i) above.

The preferred proportions of the components are as follows:

| | |
|---|---|
| Carboxyl-containing copolymer (a) | 1.0 mole equiv. CO$_2$H |
| Expoxy-compound (b) | 0.5–5.0 mole equiv. epoxide |
| Quaternary ammonium base (c) | 0.05–2.0 mole equiv. R$_4$N$^{\oplus}$ |
| Monomeric acid (d) | At least 0.025 mole equiv. CO$_2$H |

The components can be used without dilution, or they may be dissolved or dispersed in water or in an organic solvent. Suitable solvents may include reactive diluents, e.g., monofunctional epoxides, or high boiling solvents or plasticizers which remain within the composition after cure. Alcohols, which can react slowly with both epoxides and acids, are also suitable as diluents. The monomeric acid improves both shelf life and gloss of the coating as demonstrated in Table 1 below, the beneficial effects increasing with increased amounts of this component. A range of monomeric acid to CO$_2$OH of 0.1 to 10 is useful with a preferred range of 0.2 to 5 for high gloss coatings.

Components which function as leveling agents, slip aids, release agents, matting agents, colorants, dispersing aids, emulsifying agents, and the like may also be included.

EXAMPLES 1–5

Coating solutions having the formulations summarized in Table 1 were made up as follows:

A solution of half esters of a styrene/maleic anhydride copolymer having a styrene/maleic anhydride ratio of 1 and sold under the trade name SMA 1000 by Arco Chemical Company, 1500 Market Street, Philadelphia, PA 19101, was made up by dissolving the copolymer (I) (643 g.; acid value, 480 mg KOH/g) in a mixture of isopropanol (129 g) and methanol (841 g) containing sodium hydroxide (5 g). To portions of this polymer solution (12.57 g, containing 21.4 mmole carboxyl groups), a solution of di(hydrogenated tallow) dimethylammonium chloride sold under the trade name ARQUAD 2HT-75 by Akzo Chemie America, 300 South Wacker Drive, Chicago, Ill. 60606 (75% by weight in isopropanol; 2.57 g, containing 3.3 mmole quaternary ammonium compound) was added, followed by sodium hydroxide solution (10% by weight in methanol; 0.8 g). This effectively generates the quaternary hydroxide (II) (3.3 mmole) in the polymer solution, which reacts with the carboxylic acid groupings present or subsequently introduced. To each portion of these solutions there was then added, with thorough mixing, varying amounts of glacial acetic acid (III) as shown in Table 1 (Compositions A through E), followed by bisphenol-A diglycidyl ether (IV) (Araldite 6010, Ciba-Geigy; 4.0 g; 21.4 mmole). The solid non-volatile content of the solution is then approximately 56 percent by weight.

The compositions were then applied to lithographically printed, clay coated board using a hand-held engraving roll (120 Quad), and the coated boards were cured in a forced air oven set to raise the temperature of the coated surface to 300 F.(149 C.) in 30 seconds. The dry film weight applied was about 1.9 lb/3000 ft$^2$ ream.

The results of tests on the coating compositions A-E and on the coated, cured boards are summarized in Table 1. As can be seen, as the amount of monomeric acid (d) is increased, the pot life of the compositions increases, but the degree of cure as measured by the cured film performance in the heat test does not change significantly. All the clear, cured films had a high gloss and were odorless.

TABLE 1

COATING FORMULATIONS CHARACTERISTICS

Each composition contains:

Carboxyl-containing copolymers (I), 21.3 mmole, 1.0 mole equiv.;
Quaternary ammonium hydroxide (II), 3.3 mmole, 0.15 mole equiv;
Epoxide (IV), 21.3 mmole, 1.0 mole equiv. in methanol/isopropanol TABLE 1-continued

| COATING FORMULATIONS CHARACTERISTICS | | | | | |
|---|---|---|---|---|---|
| Composition | A | B | C | D | E |
| Acetic Acid (III) (mole equiv.) | 0.0 | 0.1 | 0.2 | 0.3 | 0.45 |
| pH (Note A) | 4.6 | 4.1 | 3.9 | 3.8 | 3.7 |
| Pot Life (days) (Note B) | 3.5 | 4.0 | 5.0 | 5.5 | 6.5 |
| Heat Resistance (Note C) | A | A | A | A | A |
| Gloss (Note D) | 66 | 68 | 70 | 75 | 71 |

NOTES:
(A) Measured pH on 33% dispersion in distilled water at ca. 25 C.
(B) Days after which the composition becomes unpourable at room temperature.
(C) Cured, coated boards (2 × 4″), conditioned to contain 10% w/w water, were pressed at 250 and 600 psig between wrought iron bars of a Sentinel Heat Sealer heated to 300 F. (149 C.) for two seconds. Ratings: A, falls off bar when bars separate; B, slight sticking, requiring gentle tap of board to remove from opened bars; through E, severe sticking and detachment of coating on to heated bar.
(D) Gloss of cured coated surface measured with a Hunter reflectometer at 20° at ambient temperature.

EXAMPLE 6

A coating composition was prepared from a styrene/acrylic acid copolymer having an acid value of 200 mg KOH/g sold under the trade name JONCRYL 67 by S. C. Johnson & Son, Inc., 1525 Howe Street, Racine, WI 53403 by dissolving and thoroughly mixing each of the following components in the order listed below.

| Component | Grams |
|---|---|
| Styrene/acrylic acid copolymer | 750 |
| Isopropanol | 994 |
| Di(hydrogenated tallow)dimethylammonium chloride (75% in isopropanol) | 207 |
| Acetic Acid | 50 |
| Bis-phenol A diglycidyl ether (Epoxide value, 0.535 equiv./100 g) | 500 |

This solution was coated continuously onto printed board with a flexographic printing unit at a dry resin weight of about 3.0 lb/3000 ft³ ream. The coating on litho-printed board having a bsis weight of 200 lb/3000 ft² ream was cured by continuous feed at 130 feet per minute through an oven such that the surface of the board attained a temperature of 300 F. after 13 seconds residence.

At this stage the coated surface had a gloss (20° Hunter) of 93 and was rated A in the heat test described in Example 1.

The roll of coated board was next run through a spray of water such that the water content of the moisturized board in the rollup was 9–11%. The board was then fed to a press which molded plates at elevated temperature and high pressure. The resulting plates had a gloss rating (20° Hunter) of 86. The plates were completely impermeable to water and to hot oil. No objectional odors were detected when the plates were heated for a prolonged period in a plastic enclosure, nor when they were heated in a microwave oven.

A sample of the original coating solution was still pourable after 7 days at ambient temperature and was dilutable with isopropanol.

The coating compositions are capable of producing excellent glossy finish coatings on paper for subsequent decorating when applied at a rate in the range of about 1 to about 7 pounds dry resin coating weight per ream (3000 square feet). When the coating compositions are applied to paperboard, the preferred coating rate is in the range of 0.7 to 5 pounds dried resin weight per ream of 3000 square feet.

What is claimed is:

1. A process for coating paper which comprises applying to the surface of said paper an amount equivalent to from about 0.7 to about 7 pounds dried resin weight per 3000 square feet ream an epoxide composition comprising:
   (a) a polymer or copolymer containing carboxylic acid groupings;
   (b) an epoxy-compound containing on average more than one epoxide grouping;
   (c) a quaternary ammonium base or a salt thereof; and
   (d) a monomeric acid in an amount equivalent to 0.025 to 10 mole equivalents for each mole of carboxylic acid groupings contained in component (a); and subsequently heating the coating composition to a temperature sufficient to cause the coating to crosslink and cure.

2. A process according to claim 1 wherein said paper is printed paperboard and said composition is applied as an overprint varnish.

3. A process according to claim 1 wherein said paper is a paperboard and said composition is applied to the surface of said paper in an amount equivalent to from about 0.7 to about 5 pounds dried resin weight per 3000 square feet ream.

4. A process according to claim 1 wherein a thin metallic layer is applied to said paper coated with said epoxide coating composition prior to curing the composition.

* * * * *